(12) United States Patent
Goto

(10) Patent No.: US 8,553,556 B2
(45) Date of Patent: Oct. 8, 2013

(54) COMMUNICATION APPARATUS AND COMMUNICATION METHOD THEREFOR TO SET COMMUNICATION PARAMETERS

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 12/867,614

(22) PCT Filed: Jan. 30, 2009

(86) PCT No.: PCT/JP2009/000369
§ 371 (c)(1),
(2), (4) Date: Aug. 13, 2010

(87) PCT Pub. No.: WO2009/104359
PCT Pub. Date: Aug. 27, 2009

(65) Prior Publication Data
US 2010/0315976 A1 Dec. 16, 2010

(30) Foreign Application Priority Data
Feb. 19, 2008 (JP) ................................ 2008-037416

(51) Int. Cl.
*H04L 1/00* (2006.01)
(52) U.S. Cl.
USPC ............ 370/236; 370/235; 370/252; 370/312

(58) Field of Classification Search
None
See application file for complete search history.

(56) References Cited

U.S. PATENT DOCUMENTS

| | | | |
|---|---|---|---|
| 8,302,166 B2* | 10/2012 | Balakrishnan et al. | 726/5 |
| 2003/0065757 A1* | 4/2003 | Mentze et al. | 709/222 |
| 2003/0179742 A1* | 9/2003 | Ogier et al. | 370/351 |
| 2003/0179750 A1* | 9/2003 | Hasty et al. | 370/390 |
| 2006/0092861 A1* | 5/2006 | Corday et al. | 370/256 |
| 2007/0043844 A1* | 2/2007 | Sakai | 709/223 |
| 2007/0189192 A1* | 8/2007 | Kim | 370/255 |
| 2007/0265009 A1* | 11/2007 | Hamaguchi | 455/436 |
| 2007/0274274 A1* | 11/2007 | Carothers | 370/338 |
| 2008/0089300 A1 | 4/2008 | Yee | |
| 2009/0080390 A1* | 3/2009 | Zhou et al. | 370/338 |
| 2010/0228868 A1* | 9/2010 | Sakai | 709/228 |

FOREIGN PATENT DOCUMENTS

| | | |
|---|---|---|
| CN | 101288285 A | 10/2008 |
| JP | 2005-065182 A | 3/2005 |
| WO | WO2008/050815 A2 | 5/2008 |

* cited by examiner

*Primary Examiner* — Donald Mills
(74) *Attorney, Agent, or Firm* — Canon USA, Inc., IP Division

(57) ABSTRACT

In order to prevent a communication-parameter automatic setting process from being performed by unintended communication apparatuses, a communication terminal having detected a plurality of communication-parameter providing apparatuses sends a notification indicating that the plurality of providing apparatuses exist to another terminal.

20 Claims, 7 Drawing Sheets

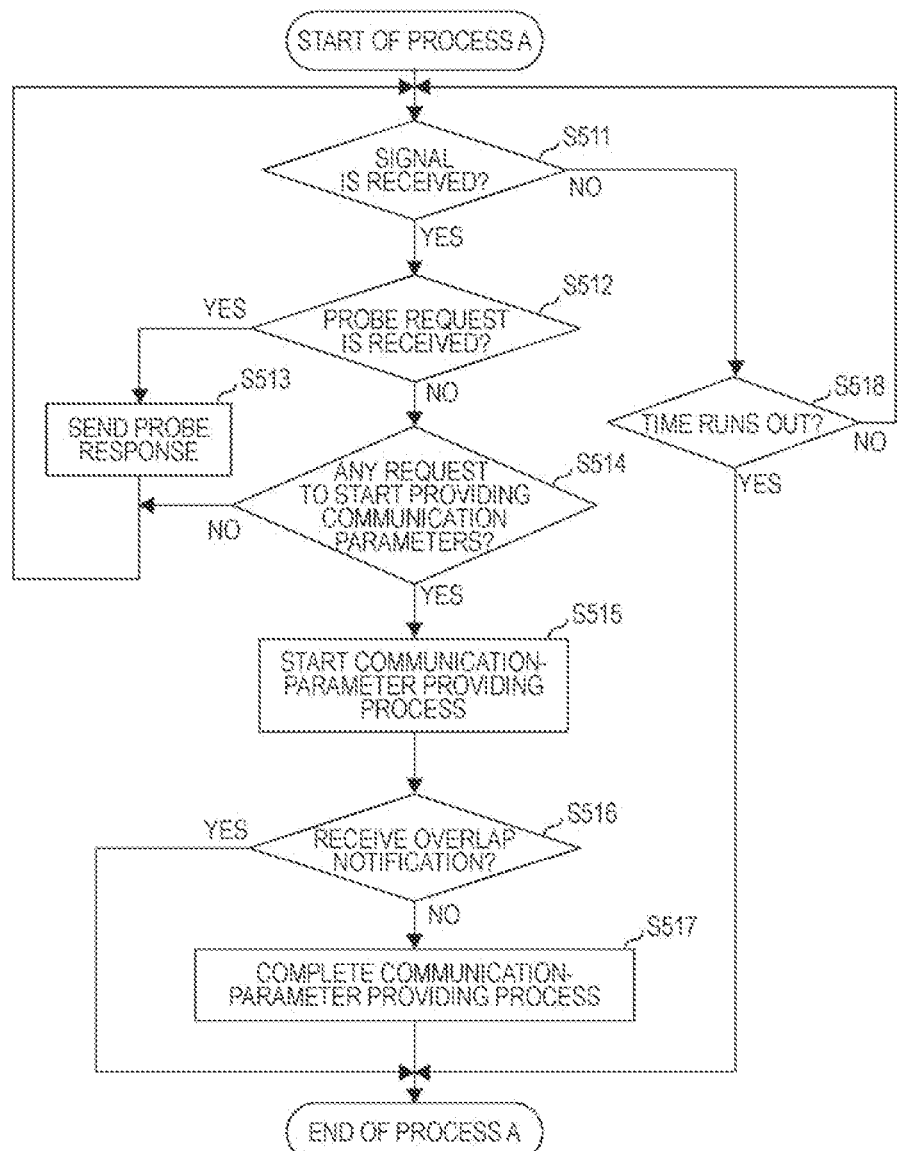

US 8,553,556 B2

COMMUNICATION APPARATUS AND COMMUNICATION METHOD THEREFOR TO SET COMMUNICATION PARAMETERS

CROSS REFERENCE TO RELATED APPLICATIONS

This application is a National Stage filing of PCT application No. PCT/JP2009/000369, filed Jan. 30, 2009, which claims priority from Japanese Patent Application No. 2008-037416, filed Feb. 19, 2008, both of which are hereby incorporated by reference herein in their entirety.

TECHNICAL FIELD

The present invention relates to techniques of setting communication parameters.

BACKGROUND ART

In wireless communication represented by wireless local area networks (LANs) conforming to the IEEE 802.11 standard series, there are many setting items that must be set prior to use.

For example, as setting items, there are communication parameters needed to perform wireless communication, such as the Service Set Identifier (SSID) which is a network identifier, an encryption method, an encryption key, an authentication method, and an authentication key. It is very complicated for the user to manually enter and set these communication parameters.

Therefore, various manufacturers have devised automatic setting methods for easily setting communication parameters in wireless devices. In these automatic setting methods, one device provides communication parameters to another device connected thereto using a procedure and messages determined in advance between these connected devices, and accordingly the communication parameters are automatically set.

Non Patent Citation 1 discloses an example of automatically setting communication parameters. In this example where automatic setting is performed, there are two methods, one involving the user to enter an authentication code to a device (hereinafter called an authentication code method), and the other not involving the user to enter an authentication code (hereinafter called a non-authentication code method) (see Non Patent Citation 1 for details).
Non Patent Citation 1: Wi-Fi CERTIFIED™ for Wi-Fi Protected Setup: Easing the User Experience for Home and Small Office Wi-Fi® Networks, http://www.wi-fi.org/wp/wifi-protected-setup The authentication code method performs an authentication process between devices using the entered authentication code. If the authentication process is successful, one device provides communication parameters to the other device, and the other device receives the communication parameters. In this case, the devices can securely share the communication parameters by performing the authentication process.

In the non-authentication code method, when a device starting a communication-parameter automatic setting process is detected, communication parameters are automatically provided to the detected device. An example of the non-authentication code method is a method of starting a setting process in response to pressing of a setting start button provided in a device and performing automatic setting with another device that has similarly started a setting process during the setting process (hereinafter called a button pressing method). The non-authentication code method is inferior to the authentication code method in security. However, since the user need not enter the authentication code, the non-authentication code is advantageous in that the operation becomes easier.

As has been described above, the button pressing method automatically sets communication parameters simply by pressing the setting start button provided in a device. Therefore, the button pressing method is suitable for built-in devices with poor user interfaces.

However, when the users of a plurality of devices press the setting start buttons almost at the same time, depending on the positional relationship among the devices, communication parameters may be automatically set in unintended devices.

DISCLOSURE OF INVENTION

The present invention provides a technique of determining whether there exist a plurality of providing apparatuses that provide a communication parameter, and, when it is determined that the plurality of providing apparatuses exist, sending a notification indicating that the plurality of providing apparatuses exist to another communication apparatus.

According to the present invention, when a plurality of providing apparatuses that provide a communication parameter exist, a notification of this information can be sent to another communication apparatus. Therefore, for example, when the communication apparatus having received the notification cancels a communication-parameter setting process, a communication parameter can be prevented from being set in unintended communication apparatuses.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5B is a flowchart showing an operation of the communication-parameter providing terminal according to the embodiment.

BEST MODE FOR CARRYING OUT THE INVENTION

Preferred embodiments of the present invention will now be described in detail in accordance with the accompanying drawings.

First Embodiment

A wireless communication apparatus according to an embodiment of the present invention will now herein be described in detail with reference to the drawings. Although the following description concerns an example in which a wireless LAN system conforming to the IEEE 802.11 series is used, the communication configuration is not necessarily limited to a wireless LAN conforming to IEEE 802.11.

An exemplary hardware configuration according to the embodiment will be described.

Figure 1:
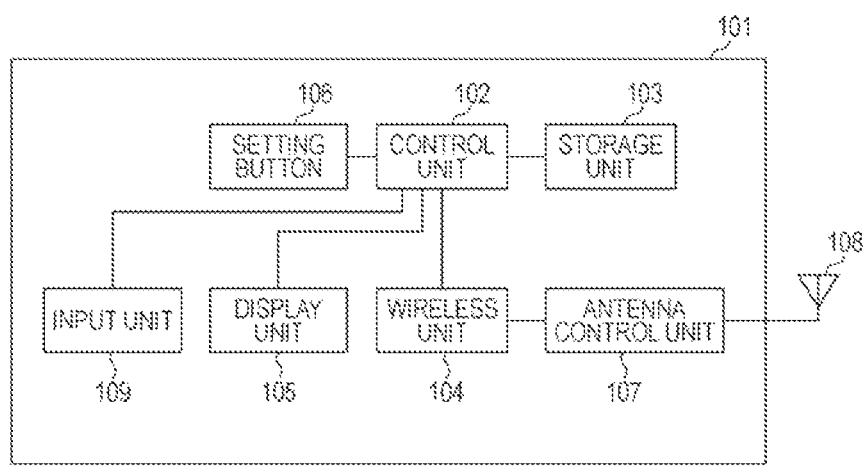
FIG. 1 is a block diagram of a terminal.

FIG. 1 is a block diagram showing an exemplary structure of each terminal, which will be described later, according to the embodiment of the present invention.

FIG. 1 shows the entirety of a terminal 101. A control unit 102 controls the entire terminal 101 by executing a control program stored in a storage unit 103. The control unit 102 additionally controls setting of communication parameters with another terminal.

The storage unit 103 stores the control program executed by the control unit 102 and various items of information, such as communication parameters. Various operations described later are performed by executing, with the control unit 102, the control program stored in the storage unit 103.

A wireless unit 104 performs wireless communication. A display unit 105 performs various displays. The display unit 105 has a function of outputting information in a visually recognizable manner, as in a liquid crystal display (LCD) or a light-emitting diode (LED), or a function of outputting sounds, as in a loudspeaker.

A setting button 106 is used for triggering or starting a communication-parameter automatic setting process. By detecting an operation entered by a user using the setting button 106, the control unit 102 starts a communication-parameter automatic setting process, which will be described later.

An antenna control unit 107 controls an antenna 108. An input unit 109 is operated to enter an authentication code for use in a communication-parameter automatic setting process. The entered authentication code is stored in the storage unit 103.

Figure 2:
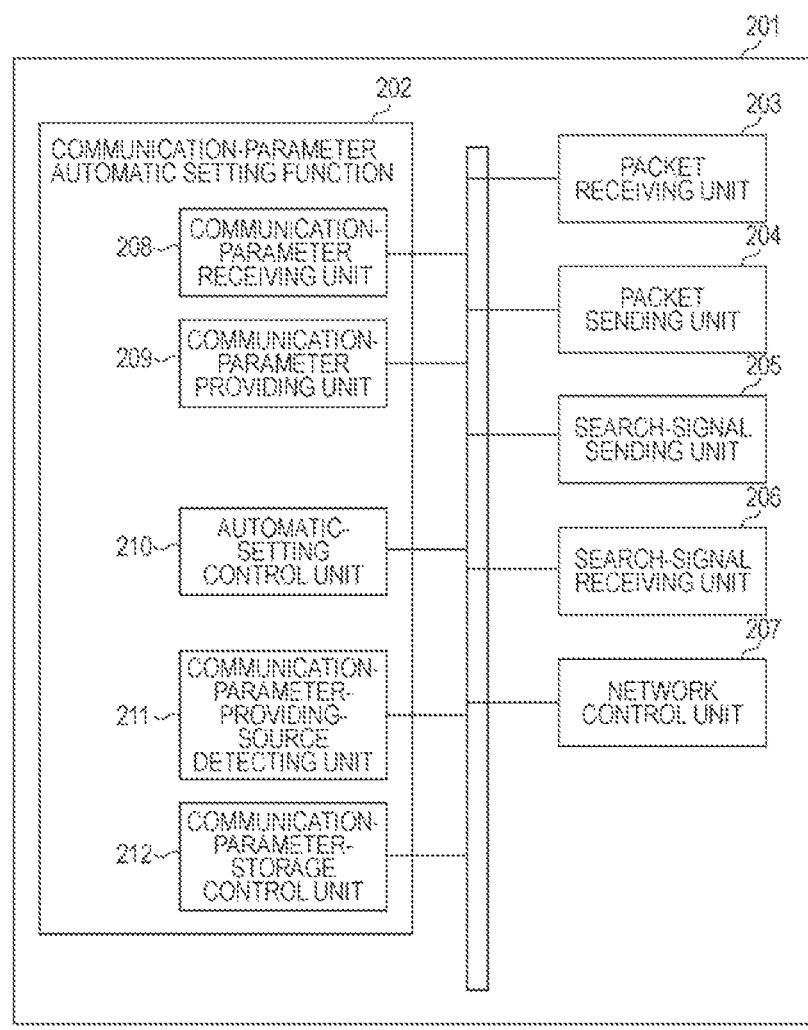
FIG. 2 is a software functional block diagram of the interior of the terminal according to an embodiment of the present invention.

FIG. 2 is a block diagram showing the configuration of a software functional block executed by a terminal that provides a communication-parameter setting operation function, which will be described later, according to the embodiment of the present invention. A control program for controlling this software structure is stored in the storage unit 103. When the control unit 102 executes the control program, operations of functions of the software structure are performed.

FIG. 2 shows the entirety of a terminal 201. The terminal 201 includes a communication-parameter automatic setting function block 202. In this embodiment, automatic setting of communication parameters needed to perform wireless communication, such as the SSID which is a network identifier, an encryption method, an encryption key, an authentication method, and an authentication key, is performed. In this embodiment, there are two types of communication-parameter automatic setting methods, namely, the authentication code method and the non-authentication code method.

A packet receiving unit 203 receives packets related to various communications. A packet sending unit 204 sends packets related to various communications.

A search-signal sending unit 205 controls sending of a device search signal, such as a probe request. A probe request may be a network search signal for searching for a desired network. Sending of a probe request, which will be described later, is performed by the search-signal sending unit 205. Also, sending of a probe response, which is a response signal in response to the received probe request, is performed by the search-signal sending unit 205.

A search-signal receiving unit 206 controls receiving of a device search signal, such as a probe request, from another terminal. Receiving of a probe request, which will be described later, is performed by the search-signal receiving unit 206. Also, receiving of a probe response is performed by the search-signal receiving unit 206. Various items of information (self-information) of the sending source device are added to a device search signal and a response signal in response thereto.

A network control unit 207 controls a network connection. Participation into a wireless LAN ad-hoc network, which will be described later, is performed by the network control unit 207.

In the communication-parameter automatic setting function block 202, a communication-parameter receiving unit 208 performs a process of receiving communication parameters from a partner device, and a communication-parameter providing unit 209 performs a process of providing communication parameters to a partner device.

An automatic-setting control unit 210 controls various protocols in a communication-parameter automatic setting process. A communication-parameter automatic setting process, which will be described later, is performed by the communication-parameter receiving unit 208 and the communication-parameter providing unit 209 under control of the automatic-setting control unit 210.

A communication-parameter-providing-source detecting unit 211 detects a terminal that provides communication parameters (hereinafter called a providing terminal). A providing-terminal search process, which will be described later, is performed by the communication-parameter-providing-source detecting unit 211. The communication-parameter-providing-source detecting unit 211 detects a providing terminal that exists on a network on the basis of the foregoing self-information of the device, which is obtained by the search-signal sending unit 205 and the search-signal receiving unit 206.

When the terminal 201 operates as a communication-parameter providing terminal, a communication-parameter-storage control unit 212 reads communication parameters to be provided from the storage unit 103. When the terminal 201 operates as a terminal that receives communication parameters from a providing terminal (hereinafter called a receiving terminal), the communication-parameter-storage control unit 212 writes the provided communication parameters into the storage unit 103.

Figure 3:
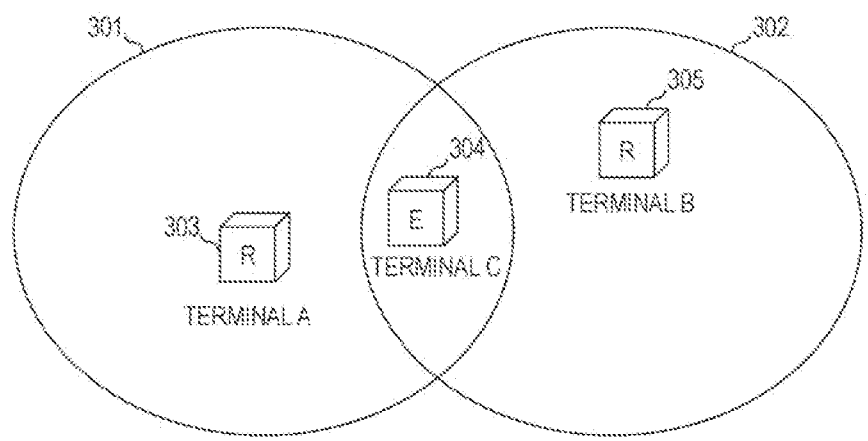
FIG. 3 is a network diagram according to the embodiment (part 1).

FIG. 3 is a diagram showing a terminal A303 (hereinafter called a terminal A), a terminal B305 (hereinafter called a terminal B), and a terminal C304 (hereinafter called a terminal C). All these terminals have an IEEE 802.11 wireless LAN communication network function and perform wireless communication by performing wireless LAN ad-hoc (hereinafter called ad-hoc) communication. These terminals have the foregoing configurations shown in FIGS. 1 and 2.

An ad-hoc network 301 is configured by communication parameters managed by the terminal A. An ad-hoc network 302 is configured by communication parameters managed by the terminal B.

The terminal C is located at a place where a communication area of the network 301 overlaps a communication area of the network 302. Therefore, the terminal C can receive wireless signals both from the terminal A and the terminal B. In this example, the terminal C is about to receive communication parameters from the terminal A and to participate into the network 301 by executing a communication-parameter automatic setting process.

In this embodiment, the case in which the button pressing method is used as the non-authentication code method will be described by way of example. In the button pressing method, communication parameters are provided if, when the setting button 106 is operated in one terminal, the setting button 106 is operated in another terminal within a predetermined time from when the setting button 106 in the former terminal is operated. The following example concerns the case in which, within a predetermined time from when the setting button 106 is operated in the terminal C, the setting buttons 106 are operated in both the terminals A and B.

When each terminal starts a communication-parameter automatic setting process, each terminal determines whether to operate as a providing terminal or a receiving terminal of communication parameters in accordance with a predetermined method. When the role of each terminal is determined, communication parameters are provided from a providing terminal to a receiving terminal. In this example, it is assumed that the terminals A and B operate as providing terminals, and the terminal C operates as a receiving terminal. The automatic setting method described in Non Patent Citation 1 above calls a providing terminal "Registrar" and a receiving terminal "Enrollee". Therefore, in FIG. 3, the providing terminals A and B are denoted by R, and the receiving terminal C is denoted by E.

When a setting process is started using the pressing button method in the positional relationship shown in FIG. 3, the terminal C may receive communication parameters not from the terminal A, but from the terminal B. Therefore, in this embodiment, a method of preventing a communication-parameter automatic setting process from being performed by unintended terminals will be described.

Figure 4:
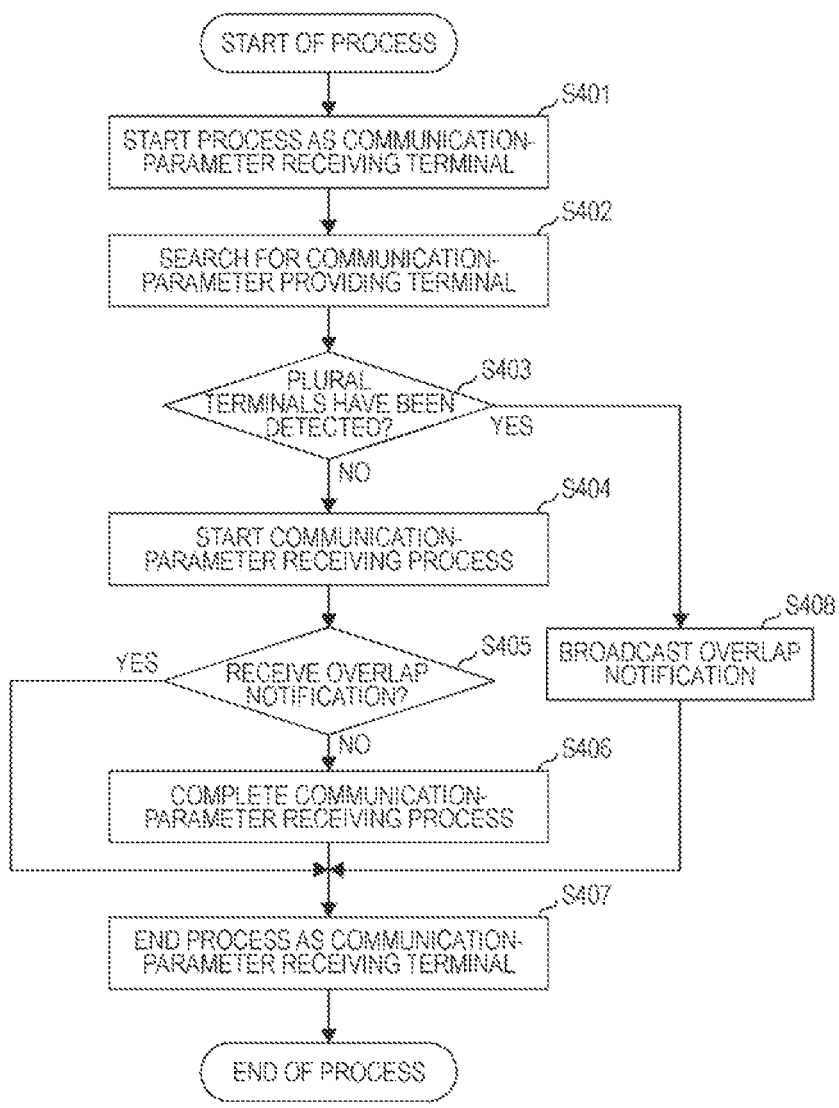
FIG. 4 is a flowchart showing an operation of a communication-parameter receiving terminal according to the embodiment.

FIG. 4 is a flowchart of the operation of a terminal operating as a communication-parameter receiving terminal (terminal C in this embodiment). When the setting button 106 is operated in the receiving terminal, the process shown in FIG. 4 is started.

When the terminal C determines to operate as a communication-parameter receiving terminal in accordance with a predetermined method, the terminal C starts a process as a receiving terminal (S401). At first, the terminal C searches for a communication-parameter providing terminal (S402). Specifically, the terminal C sends a probe request including information for giving a request for a communication-parameter automatic setting process and enters standby for receiving a probe response including information indicating that the sender of the probe response is a providing terminal for a predetermined time. Alternatively, the terminal C enters standby for receiving a beacon including information indicating that the sender of the beacon is a providing terminal for a predetermined time. When no providing terminal has been detected within the predetermined time, the terminal C ends the communication-parameter automatic setting process.

Next, the terminal C determines whether a plurality of providing terminals have been detected as a result of performing the providing-terminal searching process in step S402 (S403).

When a plurality of providing terminals have been detected in step S403, the terminal C broadcasts a notification indicating that the plurality of providing terminals exist on a network (hereinafter called an overlap notification) (S408). When the overlap notification is broadcast, surrounding terminals can be notified of the fact that the plurality of providing terminals exist.

After broadcasting of the overlap notification ends, the terminal C ends the process as a receiving terminal (S407).

Alternatively, when not a plurality of providing terminals is detected, that is, when only one providing terminal is detected, the terminal C starts a process of receiving communication parameters from the detected providing terminal (S404). Specifically, the terminal C requests the detected providing terminal to start providing communication parameters, and receives communication parameters provided from the providing terminal.

Since the terminal C may receive an overlap notification from another terminal even after having started the communication-parameter receiving process, the terminal C periodically checks whether an overlap notification is received until the communication-parameter receiving process is completed (S405).

When the communication-parameter receiving process is completed before which no overlap notification is received (S406), the terminal C ends the process as a receiving terminal (S407).

In contrast, when an overlap notification is received in step S405, the terminal C cancels the communication-parameter receiving process being performed, and ends the process as a receiving terminal (S407).

Figure 5A:
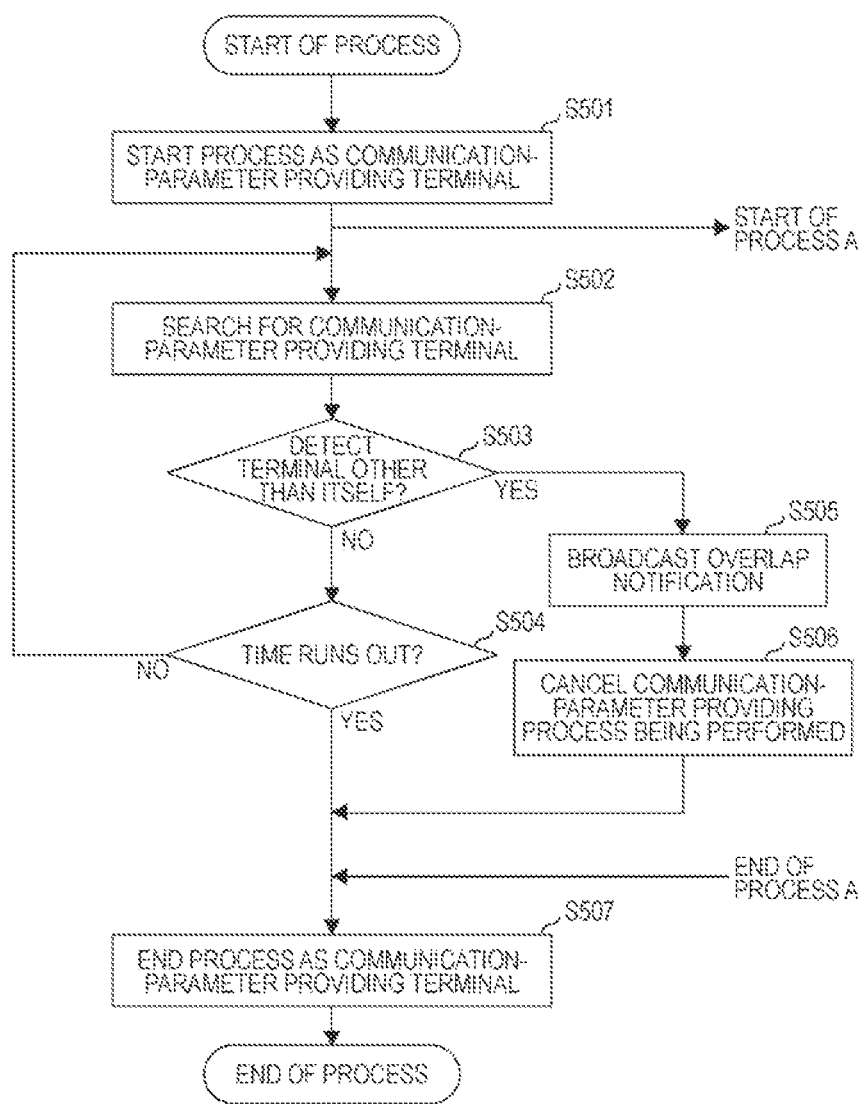
FIG. 5A is a flowchart showing an operation of a communication-parameter providing terminal according to the embodiment.

FIGS. 5A and 5B are flowcharts of the operation of a terminal operating as a communication-parameter providing terminal (terminals A and B in this embodiment). When the setting button 106 is operated in the providing terminal, the process shown in FIG. 5A is started. In the following description, the providing terminal is the terminal A by way of example.

When the terminal A determines to operate as a communication-parameter providing terminal in accordance with a predetermined method, the terminal A starts a process as a providing terminal (S501). The terminal A performs the processing in steps S502 to S506 and a process A (S511 to S518 shown in FIG. 5B) in parallel to each other. First, the process A will be described using FIG. 5B.

The terminal A is on standby for receiving a signal from another terminal (S511) until a timer in a communication-parameter automatic setting process runs out (S518). When the timer in the communication-parameter automatic setting process runs out before which no signal is received, the terminal A ends the process A and progresses to step S507.

When a signal received in step S511 is a probe request including information for giving a request for a communication-parameter automatic setting process (S512), the terminal A sends a probe response including information indicating that the sender of the probe response is a providing terminal (S513). Then, the process returns to step S511.

When a signal received in step S511 is a request from a receiving terminal to start providing communication parameters (S514), the terminal A starts a process of providing communication parameters to the receiving terminal (S515).

Since the terminal A may receive an overlap notification from another terminal even after having started the communication-parameter providing process, the terminal A periodically checks whether an overlap notification is received until the communication-parameter providing process is completed (S516).

When the communication-parameter providing process is completed before which no overlap notification is received (S517), the terminal A ends the process A and progresses to step S507.

In contrast, when an overlap notification is received in step S516, the terminal A cancels the communication-parameter providing process being performed, ends the process A, and progresses to step S507.

When the providing terminal A receives an overlap notification from another terminal, the terminal A may further forward the overlap notification to another terminal by broadcasting the overlap notification. Accordingly, all terminals located within the communication area of the providing terminal A can be notified of the fact that a plurality of providing terminals exist.

Then, the process from step S502 onward will be described.

In order to check whether a providing terminal other than the terminal A exists, the terminal A searches for a providing terminal (S502). Specifically, the terminal A sends a probe request including information for giving a request for a communication-parameter automatic setting process and enters standby for receiving a probe response including information indicating that the sender of the probe response is a providing terminal for a predetermined time. Alternatively, the terminal A enters standby for receiving a beacon including information indicating that the sender of the beacon is a providing terminal for a predetermined time.

Next, the terminal A determines whether a providing terminal other than the terminal A has been detected as a result of performing the providing-terminal searching process in step S502 (S503).

When a providing terminal other than the terminal A has been detected in step S503, the terminal A broadcasts an overlap notification (S505). The overlap notification is broadcast here because, when the communication-parameter automatic setting process is further performed, unnecessary (unintended) communication parameters may be provided. After sending the overlap notification, when the terminal A is performing the communication-parameter providing process, the terminal A ends that process (S506). Then, the terminal A ends the process as a communication-parameter providing terminal (S507).

Alternatively, instead of immediately ending the process as a providing terminal, the terminal A may periodically repeat a providing-terminal searching process. When no providing terminal other than the terminal A is detected anymore, the terminal A may resume the process as a providing terminal.

In contrast, when no providing terminal other than the terminal A has been detected in step S503, the terminal A periodically searches for a providing terminal in step S502 until a timer in a communication-parameter automatic setting process runs out (S504). When the timer in the communication-parameter automatic setting process runs out, the terminal A ends the process as a providing terminal (S507).

As described above, when a plurality of providing terminals exist in a communication-parameter automatic setting process, an unintended setting process can be avoided in advance by sending overlap notifications to one another.

In this embodiment, the above description concerns the case where both the terminals A and B are communication terminals in the ad-hoc network. However, similar processing can be performed when both or one of the terminals A and B is a wireless LAN access point with a communication-parameter providing function.

The above description concerns the case where one communication-parameter providing terminal can provide communication parameters to one terminal in one communication-parameter automatic setting process.

The case where one communication-parameter providing terminal can provide communication parameters to two or more terminals in one communication-parameter automatic setting process can be similarly described.

Figure 6:
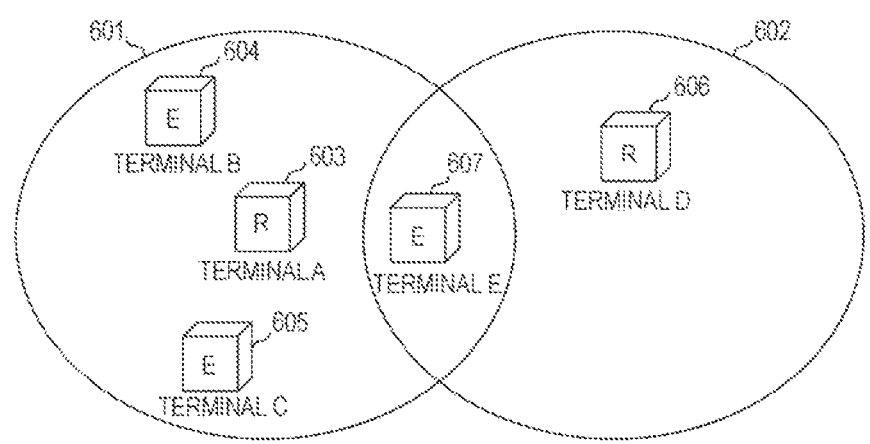
FIG. 6 is a network diagram according to the embodiment (part 2).

FIG. 6 is a diagram showing a terminal A603 (hereinafter called a terminal A), a terminal B604 (hereinafter called a terminal B), a terminal C605 (hereinafter called a terminal C), a terminal D606 (hereinafter called a terminal D), and a terminal E607 (hereinafter called a terminal E). All these terminals have the configurations described above with reference to FIGS. 1 and 2.

The terminals A and D are terminals operating as communication-parameter providing terminals. An ad-hoc network 601 is configured by communication parameters managed by the terminal A. An ad-hoc network 602 is configured by communication parameters managed by the terminal D.

The terminals B, C, and E are terminals operating as communication-parameter receiving terminals. It is assumed that the terminals B and C are performing a communication-parameter automatic setting process with the terminal A using the button pressing method. It is also assumed that the providing terminal A is providing communication parameters to the receiving terminals B and C. The following example concerns the case in which the terminals D and E start a new communication-parameter automatic setting process in which the providing terminal D provides communication parameters to the receiving terminal E.

The terminal E is located at a place where a communication area of the network 601 overlaps a communication area of the network 602. The terminal E can receive wireless signals both from the terminals A and D. Therefore, when a setting process is started using the pressing button method in this positional relationship, the terminal E may receive communication parameters not from the terminal D, but from the terminal A. Also, when the terminal E receives communication parameters from the terminal A, the terminal E can communicate even with the terminals B and C.

In order to solve such a problem, the terminals B, C, and E which are communication-parameter receiving terminals perform the foregoing operation shown in FIG. 4, and the terminals A and D which are providing terminals perform the foregoing operation shown in FIGS. 5A and 5B.

In the example shown in FIG. 6, the receiving terminal E detects that a plurality of providing terminals exist and broadcasts an overlap notification. When the overlap notification from the terminal E reaches all the terminals A to D, the terminals A to D can individually cancel the communication-parameter automatic setting process. In contrast, when the overlap notification from the terminal E does not reach the receiving terminals B and C and only the providing terminals A and D receive the overlap notification from the terminal E, the overlap notification is transferred to the receiving terminals B and C by broadcasting the overlap notification from the providing terminal A. Accordingly, a connection error caused by performing a communication-parameter automatic setting process in unintended terminals can be avoided in advance.

The exemplary embodiment disclosed herein is for illustrative purposes only, and the scope of the present invention is not limited to this embodiment. Various modifications can be made to the embodiment without departing from the gist of the present invention.

For example, the signal type of an overlap notification in the description of the foregoing embodiment is not specified. The signal type of a signal to be sent is not limited, and any signal can be used as long as it serves as an overlap notification.

Although an overlap notification is broadcast in the description of the foregoing embodiment, an overlap notification can be sent to a providing terminal. In this case, the providing terminal transfers the overlap notification to a partner receiving terminal. Accordingly, all terminals having started a communication-parameter automatic setting process can recognize that a plurality of providing terminals exist and can cancel the communication-parameter automatic setting process.

Although the description of the foregoing embodiment concerns the case where the button pressing method is used, the present invention is applicable to the case where other methods are used. For example, the present invention is applicable to the case where a communication-parameter automatic setting process is started when a contactless integrated circuit (IC) card is placed above a terminal. Furthermore, the present invention is applicable to the case where a communication-parameter automatic setting process is started when a setting start signal is received by performing short-distance wireless communication.

The description of the foregoing embodiment concerns the case where the wireless LAN conforming to IEEE 802.11 is used by way of example. However, the present invention is applicable to other wireless media such as a wireless universal serial bus (USB), MultiBand Orthogonal frequency-division multiplexing (OFDM) Alliance (MBOA), Bluetooth (registered trademark), ultra-wideband (UWB), and Zigbee. Alternatively, the present invention is applicable to a wired communication medium such as a wired LAN.

UWB includes a wireless USB, wireless 1394, WiNET, and the like.

Although the network identifier, the encryption method, the encryption key, the authentication method, and the authentication key serve as communication parameters in the description of the foregoing embodiment, other information may serve as communication parameters. That is, communication parameters include other information.

According to the present invention, a storage medium having recorded thereon a program code of software that realizes the foregoing functions is supplied to a system or apparatus, and a computer (central processing unit (CPU) or microprocessing unit (MPU)) of the system or apparatus reads and executes the program code stored on the storage medium. In this case, the program code itself read from the storage medium realizes the foregoing functions of the embodiment, and the storage medium having the program code recorded thereon constitutes the present invention.

As the storage medium for providing the program code, for example, a flexible disk, a hard disk, an optical disc, a magneto-optical disc, a compact disc read-only memory (CD-ROM), a compact disc-recordable (CD-R), a magnetic tape, a non-volatile memory card, a ROM, a digital versatile disc (DVD), or the like can be used.

As well as realizing the foregoing functions by executing the program code read by the computer, an operating system (OS) running on the computer may execute part of or the entirety of actual processing on the basis of instructions of the program code to realize the foregoing functions.

Furthermore, the program code read from the storage medium may be written into a memory included in a function expansion board placed in the computer or a function expansion unit connected to the computer. On the basis of the instructions of the program code, a CPU included in the function expansion board or the function expansion unit may execute part of or the entirety of actual processing to realize the foregoing functions.

The invention claimed is:

1. A communication apparatus, comprising:
a central processing unit;
a processing unit configured to execute, in response to a user instruction, communication-parameter sharing processing for providing a communication parameter to a receiving apparatus from a providing apparatus;
a determining unit configured to determine whether there exists another apparatus that, in response to the user instruction, has executed the communication-parameter sharing processing, in a case where the communication apparatus is executing the communication-parameter sharing processing as the providing apparatus; and
a notification unit configured to send, in a case where the communication apparatus is executing the communication-parameter sharing processing as the providing apparatus and there are plural other apparatuses that are executing the communication-parameter sharing processing as a result of determination by the determining unit, a notification to cancel executing the communication-parameter sharing processing directly to a first apparatus that is executing the communication-parameter sharing processing as a receiving apparatus,
wherein at least one of the processing unit, the determining unit, and the notification unit is implemented by the central processing unit.

2. The communication apparatus according to claim 1, further comprising:
a receiving unit configured to receive the notification from a second apparatus; and
a cancelling unit configured to cancel the communication-parameter sharing processing, which is currently being performed, upon receipt of the notification by the receiving unit from the second apparatus.

3. The communication apparatus according to claim 1, further comprising:
a receiving unit configured to receive the notification from a second apparatus; and
a transfer unit configured to transfer the notification to a third apparatus upon receipt of the notification by the receiving unit from the second apparatus.

4. The communication apparatus according to claim 1, wherein the communication apparatus is an apparatus that operates as one apparatus of the plural other apparatuses that execute the communication-parameter sharing processing, and
wherein determination is performed by the determining unit in parallel to a process of providing the communication parameter to a receiving apparatus that receives the communication parameter.

5. The communication apparatus according to claim 1, wherein the communication apparatus is an apparatus that operates as a receiving apparatus that receives the communication parameter provided from one apparatus of the plural other apparatuses that execute the communication-parameter sharing processing, and
wherein, in response to the determining unit determining that only one apparatus that executes the communication-parameter sharing processing exists, a process of receiving the communication parameter from the one apparatus is started.

6. The communication apparatus according to claim 1, wherein the notification unit sends the notification by broadcasting the notification.

7. A communication method for a communication apparatus, the communication method comprising:
executing, in response to a user instruction, communication-parameter sharing processing for providing a communication parameter to a receiving apparatus from a providing apparatus;
determining whether there exists another apparatus that, in response to the user instruction, has executed the communication-parameter sharing processing, in a case where the communication apparatus is executing the communication-parameter sharing processing as the providing apparatus; and sending, in a case where the communication apparatus is executing the communication-parameter sharing processing as the providing apparatus and there are plural other apparatuses that are executing the communication-parameter sharing processing as a result of determination, a notification to cancel executing the communication-parameter sharing processing directly to a first apparatus that is executing the communication-parameter sharing processing as a receiving apparatus, wherein at least one of executing, determining, and sending is implemented by a central processing unit.

8. A non-transitory computer-readable storage medium storing a program causing a communication apparatus to perform the communication method according to claim 7.

9. The communication apparatus according to claim 1, further comprising:

a decision unit configured to decide a roll of the communication apparatus in the communication-parameter sharing processing.

10. A communication apparatus, comprising:

a central processing unit;

a processing unit configured to execute, in response to a user instruction, a communication-parameter sharing processing for providing a communication parameter to a receiving apparatus from a providing apparatus;

a receiving unit configured to receive, directly from a first apparatus that executes the communication-parameter sharing processing as the providing apparatus, a notification which is sent in a case where the first apparatus is executing the communication-parameter sharing processing as the providing apparatus and there are plural other apparatuses that are executing the communication-parameter sharing processing as a result of determination, by the first apparatus, of whether there exists another apparatus that, in response to the user instruction, has executed the communication-parameter sharing processing; and a cancelling unit configured to cancel, in response to receiving the notification by the receiving unit, the communication-parameter sharing processing as the receiving apparatus, wherein at least one of the processing unit, the receiving unit, and the cancelling unit is implemented by the central processing unit.

11. The communication apparatus according to claim 10, wherein the communication apparatus is an apparatus that operates as the receiving apparatus in the communication-parameter sharing processing.

12. The communication apparatus according to claim 10, further comprising:

a decision unit configured to decide a roll of the communication apparatus in the communication-parameter sharing processing.

13. The communication apparatus according to claim 10, further comprising:

a determining unit configured to determine whether there exists a second apparatus that, in response to user instructions, executes the communication-parameter sharing processing; and a notification unit configured to send, in response to the determining unit determining that a plurality of second apparatuses that execute the communication-parameter sharing processing exist, a notification which causes at least one second apparatus of the plurality of second apparatuses to cancel the communication-parameter sharing processing being in execution.

14. A method to control a communication apparatus, the method comprising:

executing, in response to a user instruction, a communication-parameter sharing processing for providing a communication parameter to a receiving apparatus from a providing apparatus;

receiving, directly from a first apparatus that executes the communication-parameter sharing processing as the providing apparatus, a notification which is sent in a case where the first apparatus is executing the communication-parameter sharing processing as the providing apparatus and there are plural other apparatuses that are executing the communication-parameter sharing processing as a result of determination, by the first apparatus, of whether there exists another apparatus that, in response to the user instruction, has executed the communication-parameter sharing processing; and cancelling, in response to receiving the notification, the communication-parameter sharing processing as the receiving apparatus, wherein at least one of executing, receiving, and cancelling is implemented by a central processing unit.

15. A non-transitory computer-readable storage medium storing a program causing a communication apparatus to perform the method according to claim 14.

16. The communication apparatus according to claim 1, wherein the notification unit sends the notification by using wireless communication conforming to IEEE 802.11.

17. The communication apparatus according to claim 1, wherein the communication parameter includes at least one of a network identifier, an encryption method, an authentication method, and an authentication key.

18. The communication apparatus according to claim 10, wherein the receiving unit receives the notification by using wireless communication conforming to IEEE 802.11.

19. The communication apparatus according to claim 10, wherein the communication parameter includes at least one of a network identifier, an encryption method, an authentication method, and an authentication key.

20. The communication apparatus according to claim 1, further comprising:

a cancel unit configured to cancel the execution of the communication-parameter sharing processing as an error, in response to determining that there are plural apparatuses that are executing the communication-parameter sharing processing in a case where the communication apparatus is operating as the providing apparatus.

* * * * *